United States Patent
Koll

(10) Patent No.: US 8,995,649 B2
(45) Date of Patent: Mar. 31, 2015

(54) SYSTEM AND METHOD FOR MULTIPLE HEADSET INTEGRATION

(71) Applicant: Plantronics, Inc., Santa Cruz, CA (US)

(72) Inventor: Kenneth Koll, Los Gatos, CA (US)

(73) Assignee: Plantronics, Inc., Santa Cruz, CA (US)

(*) Notice: Subject to any disclaimer, the term of this patent is extended or adjusted under 35 U.S.C. 154(b) by 95 days.

(21) Appl. No.: 13/802,276

(22) Filed: Mar. 13, 2013

(65) Prior Publication Data

US 2014/0274004 A1    Sep. 18, 2014

(51) Int. Cl.
*H04M 1/00* (2006.01)
*H04M 9/00* (2006.01)
*H04M 3/56* (2006.01)

(52) U.S. Cl.
CPC ................................. *H04M 3/568* (2013.01)
USPC ..................... 379/428.02; 379/430; 379/441

(58) Field of Classification Search
CPC .. H04M 1/0258; H04M 1/6058; H04M 3/568
USPC ............... 379/421, 428.02, 441; 381/74, 119, 381/370; 455/575.2; 700/94
See application file for complete search history.

(56) References Cited

U.S. PATENT DOCUMENTS

| | | | |
|---|---|---|---|
| 4,360,910 A | | 11/1982 | Segal et al. |
| 5,487,067 A | * | 1/1996 | Matsushige .................. 370/460 |
| 6,009,166 A | * | 12/1999 | Polito et al. .................. 379/422 |
| 6,119,179 A | * | 9/2000 | Whitridge et al. ............. 710/72 |
| 6,405,027 B1 | | 6/2002 | Bell |
| 6,801,611 B2 | | 10/2004 | Guccione et al. |
| 6,839,417 B2 | | 1/2005 | Weisman et al. |
| 6,990,356 B2 | | 1/2006 | Charney et al. |
| 7,254,123 B2 | | 8/2007 | Jukarainen |
| 7,373,210 B2 | * | 5/2008 | Pennock et al. ................ 700/94 |
| 7,567,677 B1 | * | 7/2009 | Chan et al. ................... 381/71.1 |
| 7,707,250 B2 | | 4/2010 | Guccione |
| 7,742,758 B2 | | 6/2010 | Guccione |
| 7,957,771 B2 | | 6/2011 | Frerking et al. |
| 2002/0057682 A1 | | 5/2002 | Hansen et al. |
| 2003/0012148 A1 | | 1/2003 | Peters |
| 2003/0058806 A1 | | 3/2003 | Meyerson et al. |
| 2003/0100274 A1 | | 5/2003 | Brown |
| 2003/0152055 A1 | | 8/2003 | Aragones et al. |
| 2003/0157929 A1 | | 8/2003 | Janssen et al. |
| 2004/0058674 A1 | | 3/2004 | Yoakum |

(Continued)

FOREIGN PATENT DOCUMENTS

CN    2667810        12/2004
WO   WO 01/43351 A2   6/2001
WO   WO 01/78443 A2  10/2001

OTHER PUBLICATIONS

Xue et al., "Basestation Collaboration in Bluetooth Voice Networks," Computer Networks, 41:289-301, 2003.

*Primary Examiner* — Tuan D Nguyen

(57) ABSTRACT

Conventional Universal Serial Bus (USB) headsets or other headsets capable of being connected to a digital data port may be connected in a collaborative configuration using a multiple headset integrator. The multiple headset integrator unifies multiple calling parties at a local end point of an audio communication with a remote calling party. Other peripheral communication devices may also be used, and controls may be provided on the multiple headset integrator or control signals may be passed from the headsets or other wearable communication devices.

25 Claims, 6 Drawing Sheets

(56) References Cited

U.S. PATENT DOCUMENTS

2005/0286443 A1 12/2005 McMillen et al.
2007/0147644 A1 6/2007 Bodley et al.
2007/0294263 A1 12/2007 Punj et al.

* cited by examiner

SYSTEM AND METHOD FOR MULTIPLE HEADSET INTEGRATION

BACKGROUND

Corded headsets may be analog or digital. Analog headsets typically include an earphone/earbud (a sound reproducer), a microphone (for sound capture), a cable that relays analog audio signals between the earphone or microphone and one or two jacks that plug into one or two corresponding analog sockets in an electronic device.

A digital corded headset also typically includes an earphone (sound reproducer) and a microphone (for sound capture), but further include electronics that convert the analog signals generated by the microphone (or utilized by the earphone) into (or from) digital data that conforms to a digital data transmission protocol. The current protocol used by digital corded headsets is USB, although of course other protocols may be used or may become commonly used in the future.

USB headsets may optionally provide additional capabilities, for example: a second earphone for binaural or stereo listening, a noise canceling microphone and controls that communicate through using the USB protocol to control functions in the computer or communication client. e.g. Volume control, mute, call answer/end, etc.)

Both analog and digital headsets are typically intended for use by a single person, limiting the number of participants at each end of a conversation.

SUMMARY OF THE INVENTION

According to one aspect of the invention, provided is a multiple communication-device integrator comprising a first digital data port for exchanging first digital audio data with a first peripheral communication device having a speaker and a microphone; a second digital data port for exchanging second digital audio data with a second peripheral communication device having a speaker and a microphone; a third digital data port configured to exchange third digital audio data with a telecommunications device that is in communication with a remote source; a transmit mixer configured to receive first and second digital audio data from the first and second headsets and to mix the transmitted first and second digital audio data into third digital audio data to be transmitted to the remote source via the communication port; and a receive distributor configured to receive third audio data from the remote source via the communication port and to route the third digital audio data to the first and second digital data ports as received first and second digital audio data.

The integrator may further comprise a first user-operable control to mute and unmute the microphone of the first peripheral communication device and a second user-operable control to mute and unmute the microphone of the second peripheral communication device.

The first and second digital data ports may comprise sockets, the third digital data port may comprise a plug and the peripheral communication devices may comprise headsets.

In one embodiment, the first, second and third data ports are USB ports.

According to another aspect of the invention, provided is a method of integrating audio data for multiple communication devices comprising receiving first audio data at a first digital data port, the first audio data comprising voice audio received from a first peripheral communication device; receiving second audio data at a second digital data port, the second audio data comprising voice audio received from a second peripheral communication device; combining the first and second audio data to generate third audio data; and transmitting the third audio data to a remote communication source or to a communication application for transmission to a remote communication source.

The method may further comprise receiving a signal indicative of the actuation of a user control and in response to the receipt of the signal, excluding either the first or second audio data from the third audio data.

Additionally, the method may further comprise detecting connection of the second peripheral communication device to the second digital data port and initiating the combining step subsequent to said detecting.

A notification may be provided to a user of the detection of the second peripheral device to the second digital data port and confirmation by the user may be required prior to initiating the combining step. The notification may include user-selectable initial parameters. A user-selectable initial parameter may specify that the microphone of the second peripheral communication device is to be muted.

According to another aspect of the invention, the method may further comprise receiving remote audio data from the remote telecommunication device and transmitting the remote audio data to both the first and second peripheral communication devices.

The method may still further comprise transmitting the first audio data to the second peripheral communication device and transmitting the second audio data to the first peripheral communication device.

According to another aspect of the invention, provided is a non-transitory machine-readable storage medium comprising instructions that, when executed by one or more processors of a machine, cause the machine to perform operations comprising: receiving first audio data at a first digital data port, the first audio data comprising voice audio received from a first peripheral communication device; receiving second audio data at a second digital data port, the second audio data comprising voice audio received from a second peripheral communication device; combining the first and second audio data to generate third audio data; and transmitting the third audio data to a remote communication source or to a communication application for transmission to a remote communication source.

The operations may further comprise receiving a signal indicative of the actuation of a user control and in response to the receipt of the signal, excluding either the first or second audio data from the third audio data.

Additionally, the operations may further comprise detecting connection of the second peripheral communication device to the second digital data port and initiating the combining step subsequent to said detecting.

A notification may be provided to a user of the detection of the second peripheral device to the second digital data port and confirmation by the user may be required prior to initiating the combining step. The notification may include user-selectable initial parameters. The user-selectable initial parameter may specify that the microphone of the second peripheral communication device is to be muted.

According to another aspect of the invention, the operations may further comprise receiving remote audio data from the remote telecommunication device and transmitting the remote audio data to both the first and second peripheral communication devices.

The operations may still further comprise transmitting the first audio data to the second peripheral communication device and transmitting the second audio data to the first peripheral communication device.

DETAILED DESCRIPTION OF AN EMBODIMENT OF THE INVENTION

Figure 1:
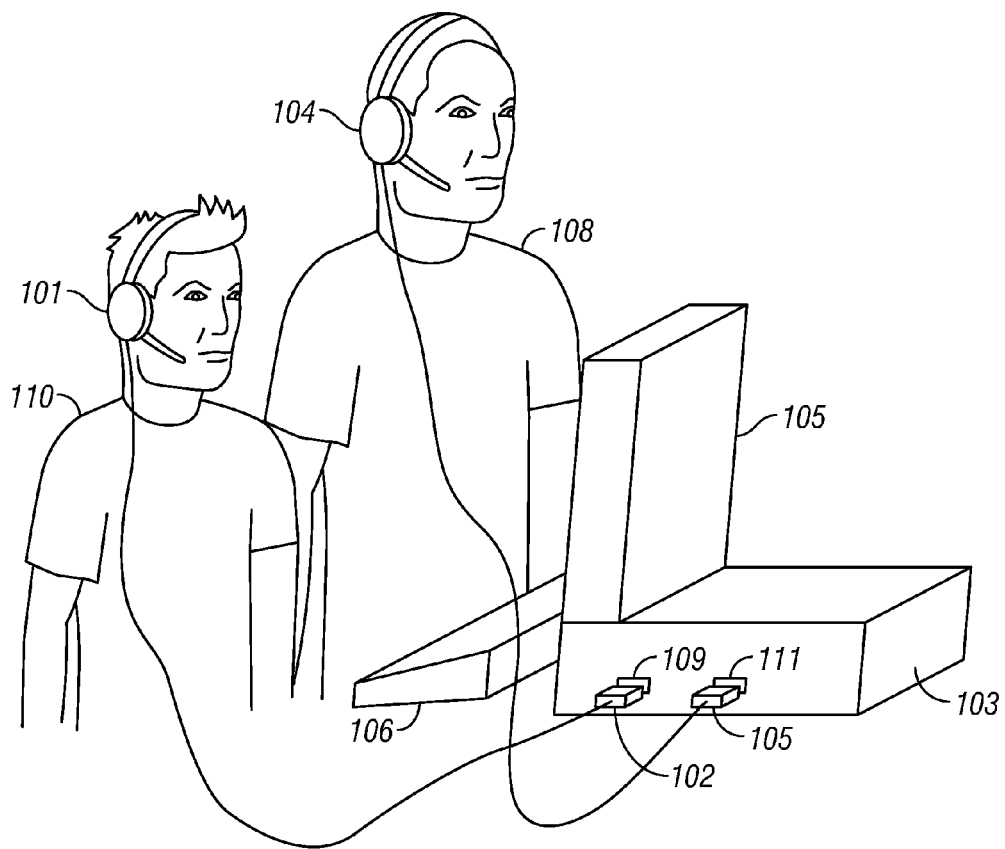
FIG. 1 illustrates a telephony workstation according to an embodiment of the invention.

For purposes of clarity, the embodiments of the invention are described herein with respect to headsets that use the Universal Serial Bus ("USB") protocol. It will be appreciated that the concepts described herein may be implemented using other protocols that may be used or may become used in the future, and the invention is not limited to the USB protocol. Additionally, while the embodiments of the invention are described herein with reference to USB headsets, other peripheral audio devices utilizing the USB protocol (or similar protocol), for example a USB handset or USB neckset or pendant may also be used.

Embodiments of the invention enable USB headsets to be connected in a configuration that unifies multiple parties at an audio communication end point that typically supports only one user. Conventional USB computer interfaces, particularly in personal computers, do not typically support having more than one audio device active at the same time. Embodiments of the invention provide the capability for multiple USB headsets to be connected to a single communication device (e.g., a personal computer or a physical phone) in a way such that the connected headsets can be active concurrently in an audio conversation with a remote calling party.

Embodiments of the invention provide a multiple headset integrator that allows multiple USB headsets to connect and work concurrently on a device designed for use with only one headset, e.g., a personal computer, dedicated telephone or other communication device or terminal. Thus, among other things, embodiments of the invention may eliminate the necessity for using different headsets for training and conferencing purposes than for routine operational purposes.

Embodiments of the invention may take multiple forms depending on factors such as the nature of the physical communication device and the communications software application. Some embodiments of the invention involve hardware configurations, others involve software configurations, or a combination of the two. Commercial implementations of some embodiments may involve adding components and/or software to existing products, such that sale of a separate article is not necessary for such embodiments. Of course, still other embodiments may entail purchase of separate physical equipment.

Embodiments of the invention may for example comprise a non-transitory machine-readable storage medium (e.g. a hard drive, flash drive, RAM, ROM, optical disc etc.) comprising instructions (e.g. software, firmware etc.) that, when executed by one or more general purpose or dedicated processors of a machine (computer, terminal, workstation, audio or videoconferencing device, etc.) cause the machine to perform the operations and methods described below.

For example, in embodiments where a personal computer executing a communications application (e.g., a softphone) provides one endpoint for a conversation with a remote calling party, a multiple headset integrator could take the form of a software application that executes on the personal computer and manages the audio for two or more headsets (e.g., USB headsets) connected to ports (e.g., USB ports) associated with the personal computer. Such an embodiment allows more than one headset to connect with the audio communication occurring between the personal computer and with the remote calling party (e.g., a customer).

For embodiments where the endpoint is a physical telephone or other communication terminal or device having a data port (e.g., a USB port), an embodiment of a multiple headset integrator could take the form of a stand-alone hardware device that allows multiple USB headsets to connect to the telephone (or terminal/device) and thus any calls transpiring on the telephone can support multiple participants at the telephone, according to an embodiment of the invention. Embodiments of the multiple headset integrator provide a connection to the phone's own data port (e.g., USB port) and two or more connections for digital headsets (e.g., such as USB headsets). Embodiments of the multiple headset integrator may provide physical controls for controlling each headset's connection to the remote user, including the ability to transmit or receive audio content, such as a talk button.

FIG. 1 illustrates a telephony workstation 100, according to an embodiment of the invention. In the telephony workstation 100, a personal computer 103 executes a communications client application that provides capabilities for voice conversation with a remote party. The communications client application may for example be a VOIP soft phone, a Unified Communications client, videoconferencing software or other communications application that provides voice communications over a communications network, such the Internet and/or other public or private data or telephony networks.

A multiple headset integrator application running on the personal computer 103 manages the audio communications for two or more USB headsets 101, 104 respectively connected to USB ports 109, 111 associated with the computer 103. Such an embodiment of the invention allows more than one headset 101, 104 to be connected with the audio communications being processed on the personal computer 103 that are associated with a call involving a remote calling party.

The headset 101 communicates with the computer 103 via a cable including a USB plug 102 that is plugged into the USB port 109 that transmits commands and audio data between the headset 101 and the computer 103. In addition to the headset 101, another headset 104 that communicates to the computer 103 via a cable with a USB plug 105 that is plugged into the USB port 111. The headsets 101, 104 include a microphone as well as an earphone or earbud.

The computer 103 may also include other computing equipment, such as a monitor 105, a keyboard 106, and various conventional hardware peripherals and software applications.

As shown in FIG. 1, both the headset 101 and the headset 104 may join a communication session (e.g., a call) conducted over a communications medium (e.g., the communication network 210 shown in FIG. 2) via the communications client application operating on the computer 103, according to an embodiment of the invention.

Joining the headsets 101, 104 into a communication session can enable enhanced calling functions for the workstation 100, according to an embodiment of the invention. For example, a worker 110 wearing the headset 101 in a call center may communicate telephonically over a communications network with a remote calling party (e.g., a customer) (not shown). Information about the customer may be shown on the monitor 105. Assume that the customer has requested assistance at a service level that cannot be provided by the worker 110. The worker 110 contacts a supervisor 108. The worker 110 may contact the supervisor 108 by an instant message, a hand wave, or a number of other methods for reaching a co-worker. The supervisor 108 then joins the worker 110 at the workstation 100 and plugs their headset into the USB port 111.

The client communication application on the computer 103 operates in conjunction with a multiple headset integrator (described in more detail with reference to FIG. 2 below) that detects that the two headsets 101, 104 have been connected to the computer 103, and the multiple headset integrator takes action to combine the audio inputs/outputs from the headset 101 and the headset 104 into the existing communication being conducted between the worker 110 and the remote calling party via the softphone application.

In most embodiments of the invention neither the client communication application nor the computer 103 require any modification in order for embodiments of the invention to operate properly provided the multiple headset integrator is present to supply audio inputs to the client communication application and direct audio output from the client communication application to the headsets 101,104. However, in other embodiments of the invention, the multiple headset integrator may be engaged as a portion of the client communication application and/or as a sub-portion of the other hardware/software associated with the computer 103.

In any event, both the worker 110 and the supervisor 108 join the call through their respective headsets 101 and 104. The worker 110 and the supervisor 108 may communicate with the remote customer. Both the worker 110 and the supervisor 108 may use any of the call control facilities that would normally be available to them in a call with a remote party.

It will be noted that the headsets 101 and 104 may also be wireless, in which case a wireless adapter may be used to provide a wireless connection between the USB ports 109, 111 and the wearable portion of the headsets 101, 104. For example a wireless USB adapter (also colloquially known as a "dongle") corresponding to each of the headsets 101, 104 may be plugged into each of the USB ports 109 and 111. Whether or not the headsets are wired or wireless headsets is transparent to the headset integrator 205.

The workstation 100 may also be applicable to various training modes that involve multiple headsets. For instance, the supervisor 108 may listen to the worker 110 practice with various training scripts, which may involve interacting with real or simulated customers. In such a case the supervisor's microphone may be muted.

Microphone control between the headset 101 and the headset 104 could be provided by an actuator (e.g., a button on the headset or on the computer display screen) (not shown), according to an embodiment of the invention. In such embodiments, the remote calling party hears just one of the headsets at a time. In other embodiments, the microphone outputs from the headsets 101, 104 may be blended together.

Figure 2:
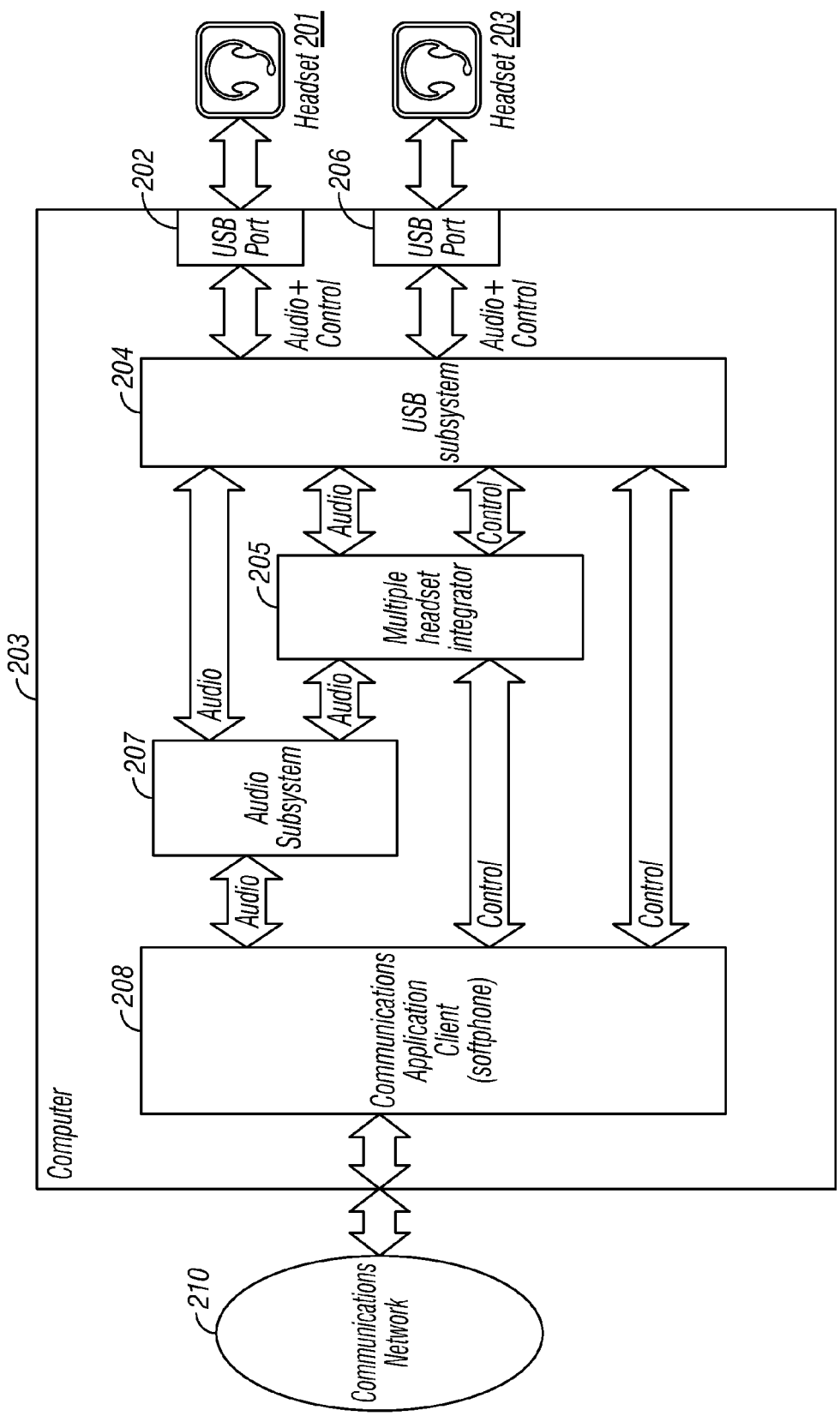
FIG. 2 illustrates a block diagram that shows the telephony workstation of FIG. 1 according to an embodiment of the invention.

FIG. 2 illustrates a block diagram that shows a telephony workstation, according to an embodiment of the invention. A headset 201 has been connected to a port 202 (e.g., a USB port) on a computer 203. Similarly, a headset 203 has been connected to a port 206 (e.g., a USB port) on the computer 203. In the standard PC (i.e. personal computer) architecture, a USB subsystem 204 and an audio subsystem function 207 on a PCI bus in the computer 203. USB audio devices like USB headsets appear in the operating system's audio subsystem control menu where they can be selected for use by a communication application 208. Many communication applications 208 also provide their own controls for selecting from the audio devices available via the audio subsystem.

In a PC embodiment of the invention, the headset integrator will appear to the PC audio subsystem as a single bi-directional USB audio device where it can be selected either in the audio subsystem control menu or in the communication application 208 options or preferences menu for use as the audio endpoint by the communication application 208. Other USB audio endpoints (e.g. headsets 201, 203) will still appear as options that can be selected directly but individually, in the event that the user of computer 203 does not want or need to utilize the capabilities of the multiple headset integrator 205.

If the multiple headset integrator 205 is selected as the USB audio endpoint for the communication application 208, then it functions at the PCI bus level to combine and distribute bi-directional audio data between the communication application 208 and two or more USB audio devices (e.g. headsets 201, 203) attached to the computer 203.

The client communication application 208 in turn facilitates communications with remote parties over a communications network 210. The communications network 210 may include one or more networks, e.g. a LAN or Wi-Fi network connected to the Internet.

The client communication application 208 operates in a conventional manner for such functions. The client communication application 208 executing on the computer 203 may comprise a specialized or proprietary telephony program with additional features such as instant messaging, desktop sharing, videoconferencing capability, or a conventional VOIP softphone application.

The multiple headset integrator 205 operates as an adjunct to the communications application client 208 in an embodiment of the invention. Alternatively the multiple headset integrator could be integrated with the communications application client. The multiple headset integrator 205 facilitates communications that unite both the headset 201 and the headset 203 as far as the communications application client 208 is concerned.

When only the headset 201 is plugged into the USB port 202, the communications application client 208 is in operation and the multiple headset integrator 205 has previously been selected as the USB audio end point, then the multiple headset integrator 205 observes that one headset is available to participate in a call managed by the communication application 208. The multiple headset integrator 205 then passes audio data between the headset 201 and the audio subsystem 207 and control commands between the headset 201 and the communications application client 208, which facilitates audio communications with a remote participant over the communications network 210.

When headset 203 is additionally plugged into the computer 103, then the multiple headset integrator 205 makes appropriate modifications to the audio communications directed to/from the headsets 203, 201 and the communications client application 208. Thus, the multiple headset integrator 205 may perform various call direction and control techniques, according to an embodiment of the invention. For example, the audio input received by the client communication 208 from the remote calling party may be duplicated so that both headset 201 and the headset 203 receive audio from the remote calling party. Additionally, the multiple headset integrator 205 receives communications from the headsets 201, 203 that the multiple headset integrator 205 may need to copy from one headset for the benefit of the other. In other words, not only does the remote calling party need to hear what the speaker said at the headset 201 but the user of the other joined headset 203 may need to as well, depending on the circumstances.

Control of the microphone output from the headsets 201, 203 can be handled in a variety of ways. In some embodiments of the invention, the microphone outputs from the headsets 201, 203 are simply mixed together to form a common signal that is transmitted to the remote calling party. In other embodiments of the invention, a user control could determine which microphone signal is coupled to the remote calling party. This user control could take a variety of forms, e.g., existing controls present on the headsets, one or more icons on the computer display, or an accessory control box connected to the computer.

Figure 3:
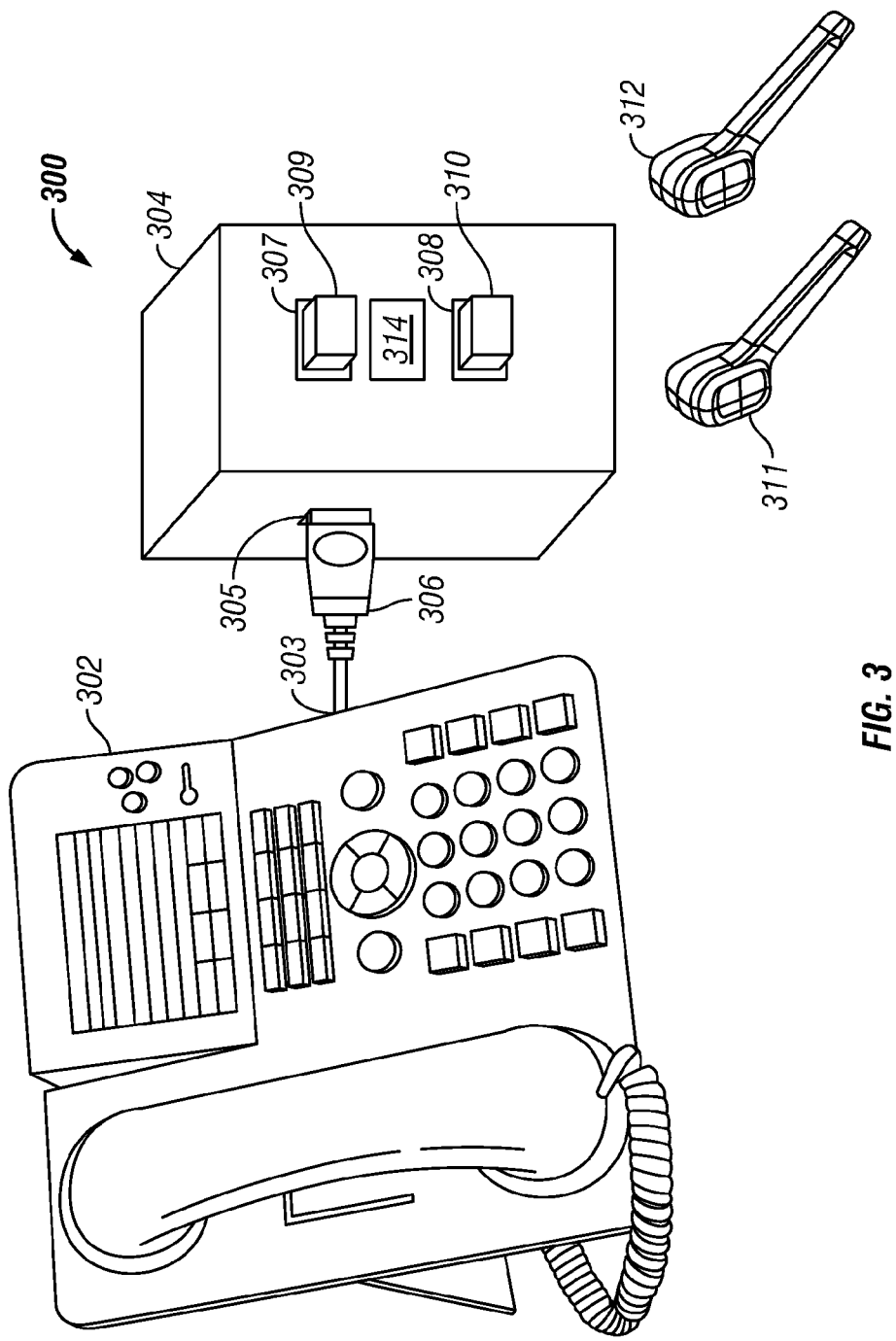
FIG. 3 illustrates an alternative embodiment in which a workstation includes a specialized communications device such as a desk phone, according to embodiment of the invention.

FIG. 3 illustrates a workstation 300 having a specialized communications device 302 rather than a computerized communication client (such as the softphone 208 shown in FIG. 2) running on a general purpose computer, according to embodiment of the invention. The specialized device could be a desk phone as shown in the figure, a trading turret, a dispatch console or other specialized voice communication terminal.

For installations where a communication endpoint is a specialized device 302 having a data port 303 (e.g., a USB port 303 for connection of a USB headset), a multiple headset integrator 304 operates as a hardware device that allows multiple headsets (e.g. USB headsets) 311, 312 to be connected to the call conducted via the device 302, according to an embodiment of the invention. Embodiments of the multiple headset integrator 304 provide a connection 305 to the device's USB port 303 and two or more USB ports 307, 308 for USB headsets.

As shown in FIG. 3, the headsets 311, 312 may be linked to the USB ports by means of wireless USB adapters 309, 310 instead of cables. In such a case, the wireless adapters 309, 310 appear to the multiple headset integrator 304 as functionally identical to wired headsets, and thus the use of a wired headset or a wireless headset with an adapter is transparent to the multiple headset integrator 304.

The multiple headset integrator 304 may also provide physical controls 314 for controlling a headset's ability to transmit or receive audio content. The controls 314 may provide the ability to control which microphone audio from the headsets 311, 312 goes to the remote calling party and/or provide other control functions, for example answer call or end. Embodiments of the invention may also provide more than two connections for headsets.

The receiving USB port 305 on the multiple headset integrator 304 makes the multiple headset integrator 302 appear as a single, bi-directional USB audio endpoint to the USB port 303 of the specialized device 302. This is also true in if the multiple headset integrator 302 is plugged into the USB port of a laptop or desktop or other general purpose device. In this case the multiple headset integrator 304 will appear as a USB audio endpoint that can be selected in the audio subsystem control menu of the operating system or in the configuration or options menu of the applicable communication application, e.g. communications application client 208 running on the computer 203 as described above with reference to FIG. 2.

The electronic circuitry within the multiple headset integrator 304 unites the inputs of the headsets 311, 312 to the USB ports 307, 308 and provides them to the specialized device 302 via the USB ports 305, 303. Similarly, the electronic circuitry within the multiple headset integrator 304 distributes the output received from the specialized device 302 at USB port 305 and distributes it to the headsets 311, 312 via the USB ports 307, 308.

In other words, a headset plugged into the USB port 307 (directly of via an adapter) will hear whatever a headset plugged into 308 hears and vice versa, and the remote party can hear the audio both from the wearer of the headset 311 and from the wearer of the headset 312, as selected or modified by the controls 314.

It should be noted that the multiple headset integrator 304 may also be used with computer 103 of the workstation 100 of FIG. 1, in which case it is not necessary for a multiple headset integrator application to be running on the computer 103. In such a case the multiple headset integrator 304 will be connected to a USB port on the computer 103 and will appear to the computer 103 as a single USB audio endpoint.

Figure 5:
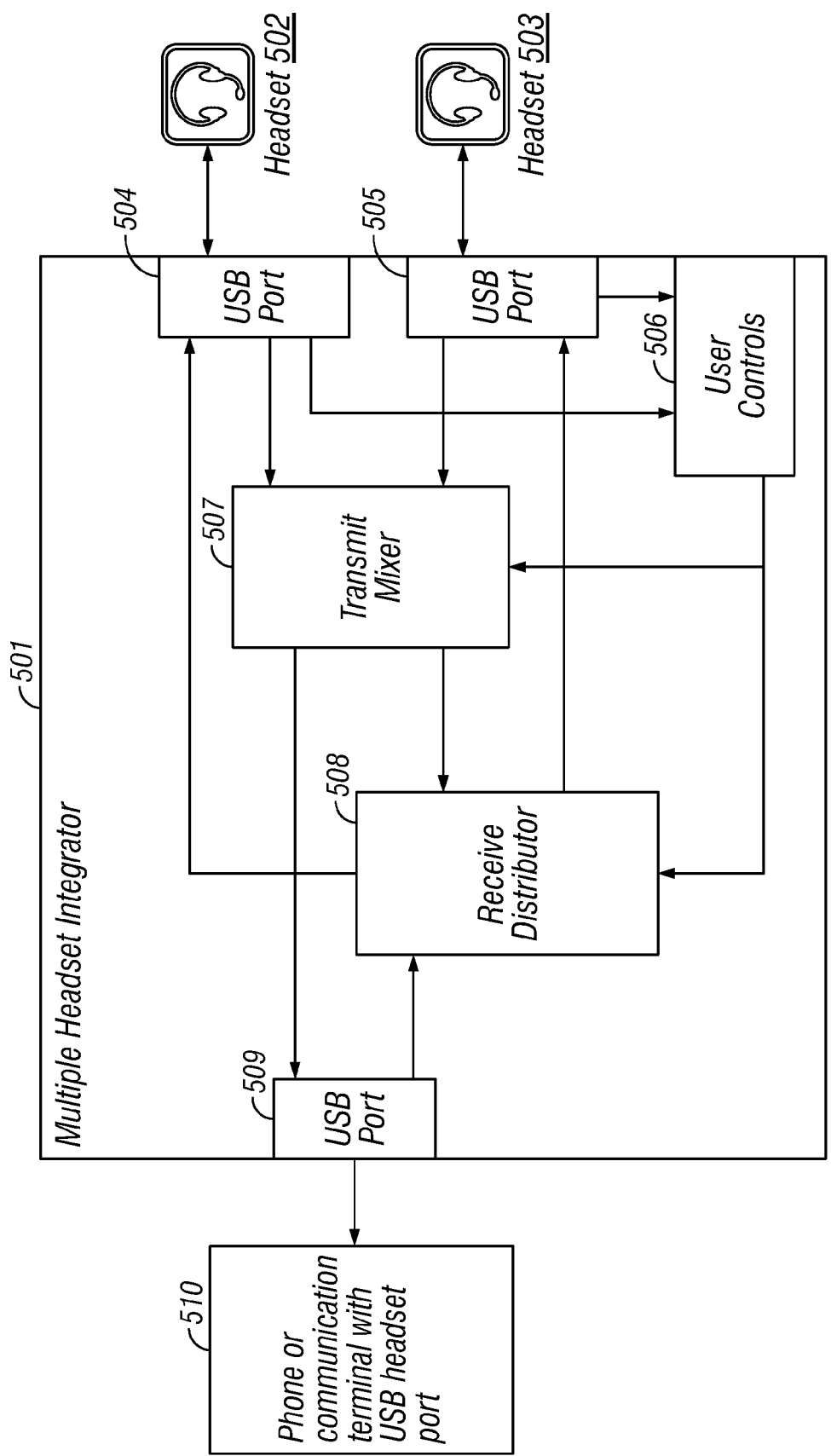
FIG. 5 illustrates a block diagram that shows various functional components of the multiple headset integrator of FIG. 3, according to an embodiment of the invention.

FIG. 5 is a block diagram that illustrates an implementation of the multiple headset integrator in a stand-alone device as described in FIG. 3.

The input USB port 509 of the multiple headset integrator 501 connects to the USB port on the communications terminal 504 either directly (see FIG. 6 below) or with a cable. The multiple headset integrator 501 also provides two or more USB ports 504, 505 for connecting USB headsets. In the example provided, USB headset 502 is connected to USB port 504 and USB headset 503 is connected to USB port 505.

The headset microphone signals (transmit) received on the USB ports 504 and 505 are provided to a transmit mixer 507, which combines them into a common signal that is routed to USB port 509, which is connected to the communication terminal 510. The combined microphone signal is also routed to the multiple headset integrator receive distributor 508 and mixed into the receive audio that is returned to the headsets 502, 503 via the USB ports 504, 505 so that the combined signal is heard by all headset users. Similarly, the output signal (receive) that is received from communication terminal 510 via USB port 509 is provided to the receive distributor 508 and distributed to the active USB ports 504, 505 so that sound from the remote party is heard on headsets 502 and 503. Of course, if only one headset 502 is present, then the transmit and receive audio is relayed between the headset 502 and the terminal 510 without requiring the mixing in of additional audio.

The multiple headset integrator 503 may include controls 506 to manage the routing of audio between the headsets 502, 503 and the communication terminal 504. Using the controls 506, the audio from both headsets 502, 503 may be routed to the communications terminal 504 or either or both microphones may be muted. Similarly, user controls 506 could selectively route receive audio to both, one or neither headset 502, 503. Controls affecting other communication functions (e.g. answer/end, hold, volume, etc.) other than audio routing could also be provided. Control could be provided by a user interface on the multiple headset integrator 503 or (alternatively or in addition) could use control signals from the headsets 502, 503 provided through the USB port 505.

Figure 4:
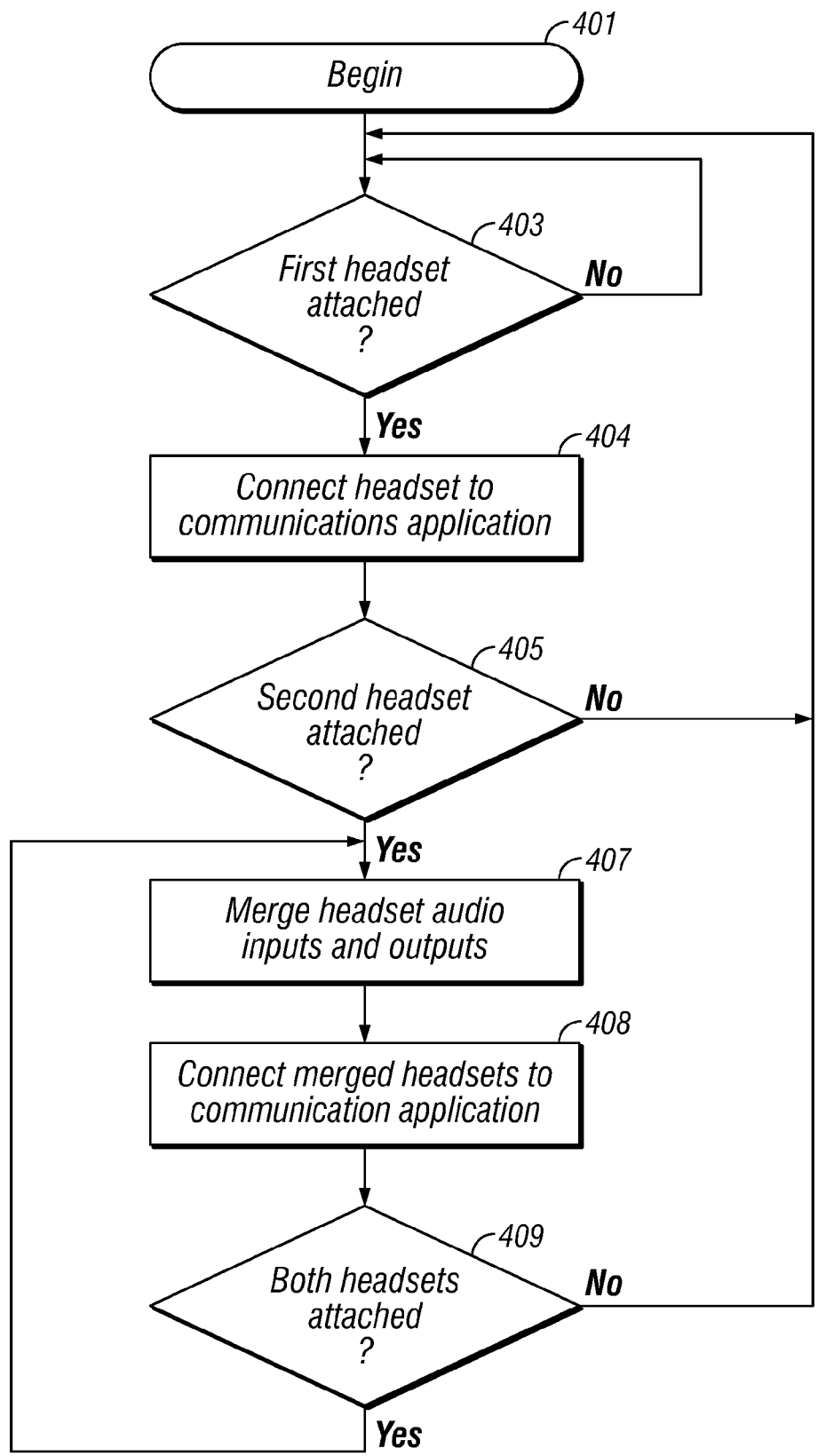
FIG. 4 illustrates a flowchart that shows the operations provided by a multiple headset integrator, according to an embodiment of the invention.

FIG. 4 illustrates an exemplary flowchart 400 that shows the operations provided by the multiple headset integrators discussed above.

The multiple headset integrator 503 checks (step 403) to see if at least one headset is attached to the communication device, e.g., the computer 103 shown in FIG. 1 or the dedicated terminal 302 shown in FIG. 3. If so, the multiple headset integrator connects the audio signals between the headset and the communications terminal (step 404).

The multiple headset integrator then checks if a second headset is connected (step 405). If a second headset is found, the multiple headset integrator combines the input and output signals (steps 407 and 408) so that the remote calling party and the headset users can communicate.

Upon detection of the connection of the second headset, an appropriate notification may be provided to the user of the computer 103 or the dedicated terminal 302. This might be provided as an audible or visible warning to the user of the first headset, respectively provided to the speaker or earbud of the first headset or shown on a display associated with the computer 103 or dedicated terminal 302. The warning might require a confirmation by the user and might provide for the selection of initial operation conditions. For example, a dialog box might state "Headset added, add to current audio setup as secondary headset? Confirm Y/N" with a check box for "Mute secondary headset microphone." This may be useful in the event a supervisor merely wants to listen in to a call without creating the possibility of additional audio being fed to the remote party. Of course the initial condition may subsequently be overridden by subsequent control signals as described in the next paragraph.

The communication is appropriately modified by any control signals received from the headsets or as a result of manipulation of controls on the multiple headset integrator itself or on the computer hosting the multiple headset integrator application. In some embodiments of the invention, the two audio inputs remain open such that either party can speak at any time. In such cases, merging means integrating the two signals together so as to produce an acceptable joined audio signal. In other embodiments of the invention, the two audio inputs may require some mechanism for each party to talk, such as actuating a button. In such embodiments, merging of the audio signals means determining which line is the live one at any given time based on which button has been depressed and merging both audio signals when both parties concurrently depress their respective buttons.

As shown in step 409, the multiple headset integrator continues to check whether both headsets are attached. If "Yes," then steps 407 and 408 continue to be performed. If "No," then the flowchart returns to step 403.

The multiple headset integrator may be implemented in hardware, software, or combinations of the two, according to various embodiments of the invention. In one embodiment, the headset integrator comprises machine-readable instructions embodied in a non-transient format, which when executed by a data processor, cause the machine to execute the method described in the flowchart of FIG. 4.

Figure 6:
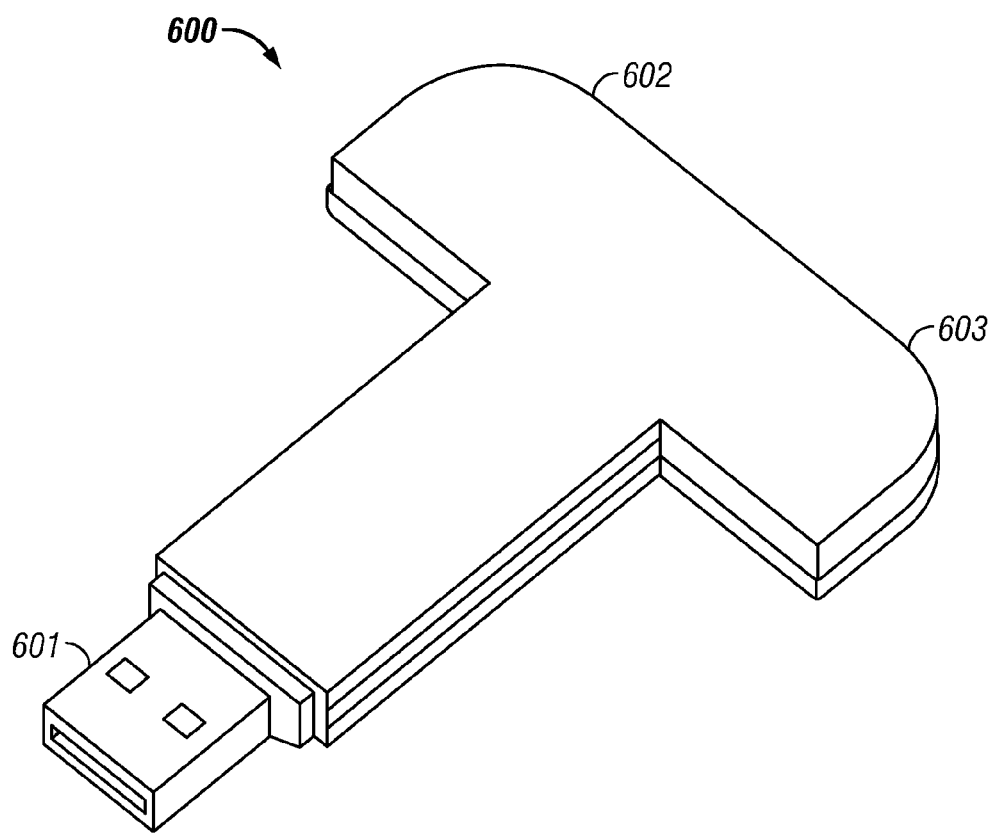
FIG. 6 illustrates an exemplary alternative implementation of the multiple headset integrator of FIG. 3, which plugs directly into a USB port.

FIG. 6 is a configuration of the multiple headset integrator 501 of FIG. 5, which can be plugged directly into the USB port of a computer or phone or other applicable communication device. As can be seen from the figure, the multiple headset integrator 600 includes a USB plug 601 that can be plugged into a corresponding USB port and two USB sockets 602, 603 for receiving the USB plugs of headsets or for receiving USB adapters like those discussed above with reference to FIG. 3. The internal structure and functioning of the multiple headset integrator 600 is as described above with reference to the multiple headset integrator 501 of FIG. 5.

While specific embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims. In general, in the following claims, the terms used should not be construed to limit the invention to the specific embodiments disclosed in the specification, but should be construed to include all systems and methods that operate under the claims set forth hereinbelow. Thus, it is intended that the invention covers the modifications and variations of this invention provided they come within the scope of the appended claims and their equivalents.

I claim:

1. A multiple headset integrator, comprising:
   a first digital data port for exchanging first digital audio data with a first peripheral communication device comprising a first headset having a speaker and a microphone;
   a second digital data port for exchanging second digital audio data with a second peripheral communication device comprising a second headset having a speaker and a microphone;
   a third digital data port configured to exchange third digital audio data with a telecommunications device that is in communication with a remote source;
   a transmit mixer configured to receive first and second digital audio data from first and second headsets and to mix the first and second digital audio data into transmitted third digital audio data to be transmitted to the remote source via the third digital data port; and
   a receive distributor configured to receive third digital audio data from the remote source via the third digital data port and to route the received third digital audio data to the first and second digital data ports as received first and second digital audio data.

2. The multiple headset integrator of claim 1, further comprising:
   a first user-operable control to mute and unmute the microphone of the first peripheral communication device.

3. The multiple headset integrator of claim 2, further comprising:
   a second user-operable control to mute and unmute the microphone of the second peripheral communication device.

4. The integrator of claim 1, wherein the first and second digital data ports comprise sockets and the third digital data port comprises a plug.

5. The integrator of claim 1, wherein the first, second, and third data ports are USB ports.

6. A method of integrating audio data for multiple headset devices, comprising:
   receiving first audio data at a first digital data port, the first audio data comprising voice audio received from a first peripheral communication device;
   receiving second audio data at a second digital data port, the second audio data comprising voice audio received from a second peripheral communication device;
   combining the first and second audio data to generate third audio data; and
   transmitting the third audio data to a remote communication source or to a communication application for transmission to a remote communication source.

7. The method of claim 6, further comprising:
   receiving a signal indicative of actuation of a user control; and
   in response to the receipt of the signal, excluding either the first or second audio data from the third audio data.

8. The method of claim 6, further comprising:
   detecting connection of the second peripheral communication device to the second digital data port; and
   initiating the combining step subsequent to said detecting.

9. The method of claim 8, further comprising:
providing a notification to a user of the detection of the second peripheral device to the second digital data port.

10. The method of claim 9, further comprising:
requiring confirmation by the user prior to initiating the combining step.

11. The method of claim 9, wherein the notification includes user-selectable initial parameters.

12. The method of claim 11, wherein a user-selectable initial parameter specifies that a microphone of the second peripheral communication device is to be muted.

13. The method of claim 6, further comprising:
receiving remote audio data from the remote telecommunication device; and
transmitting the remote audio data to both the first and second peripheral communication devices.

14. The method of claim 6, further comprising:
transmitting the first audio data to the second peripheral communication device.

15. The method of claim 14, further comprising:
transmitting the second audio data to the first peripheral communication device.

16. A non-transitory machine-readable storage medium comprising instructions that, when executed by one or more processors of a machine, cause the machine to perform operations for a multiple headset integrator comprising:
receiving first audio data at a first digital data port, the first audio data comprising voice audio received from a first peripheral communication device;
receiving second audio data at a second digital data port, the second audio data comprising voice audio received from a second peripheral communication device;
combining the first and second audio data to generate third audio data; and
transmitting the third audio data to a remote communication source or to a communication application for transmission to a remote communication source.

17. The storage medium of claim 16, wherein the operations further comprise:
receiving a signal indicative of actuation of a user control; and
in response to the receipt of the signal, excluding either the first or second audio data from the third audio data.

18. The storage medium of claim 16, wherein the operations further comprise:
detecting connection of the second peripheral communication device to the second digital data port; and
initiating the combining step subsequent to said detecting.

19. The storage medium of claim 18, wherein the operations further comprise:
providing a notification to a user of the detection of the second peripheral device to the second digital data port.

20. The storage medium of claim 19, wherein the operations further comprise:
requiring confirmation by the user prior to initiating the combining step.

21. The storage medium of claim 19, wherein the notification includes user-selectable initial parameters.

22. The storage medium of claim 21, wherein a user-selectable initial parameter specifies that a microphone of the second peripheral communication device is to be muted.

23. The storage medium of claim 16, wherein the operations further comprise:
receiving remote audio data from a remote telecommunication device; and
transmitting the remote audio data to both the first and second peripheral communication devices.

24. The storage medium of claim 16, wherein the operations further comprise:
transmitting the first audio data to the second peripheral communication device.

25. The storage medium of claim 24, wherein the operations further comprise:
transmitting the second audio data to the first peripheral communication device.

* * * * *